United States Patent
Lee et al.

(10) Patent No.: US 10,943,344 B2
(45) Date of Patent: Mar. 9, 2021

(54) DETECTION METHOD FOR DISPLAY PANEL MOTHERBOARD AND DISPLAY PANEL MOTHERBOARD

(71) Applicants: BOE TECHNOLOGY GROUP CO., LTD., Beijing (CN); CHONGQING BOE OPTOELECTRONICS TECHNOLOGY CO., LTD., Chongqing (CN)

(72) Inventors: Gyuhyun Lee, Beijing (CN); Mao Ren, Beijing (CN); Wupeng Wen, Beijing (CN); Chaoqiang Liu, Beijing (CN); Jingui Han, Beijing (CN)

(73) Assignees: BOE TECHNOLOGY GROUP CO., LTD., Beijing (CN); CHONGQING BOE OPTOELECTRONICS TECHNOLOGY CO., LTD., Chongqing (CN)

( * ) Notice: Subject to any disclaimer, the term of this patent is extended or adjusted under 35 U.S.C. 154(b) by 148 days.

(21) Appl. No.: 16/122,641

(22) Filed: Sep. 5, 2018

(65) Prior Publication Data

US 2019/0287231 A1   Sep. 19, 2019

(30) Foreign Application Priority Data

Mar. 14, 2018   (CN) .......................... 201810211701.8

(51) Int. Cl.
G06T 7/00   (2017.01)

(52) U.S. Cl.
CPC .... G06T 7/001 (2013.01); *G06T 2207/20021* (2013.01); *G06T 2207/30141* (2013.01); *G06T 2207/30208* (2013.01)

(58) Field of Classification Search
CPC .......... G06T 7/001; G06T 2207/30208; G06T 2207/30141; G06T 2207/20021;
(Continued)

(56) References Cited

U.S. PATENT DOCUMENTS 9,239,341 B2   1/2016   Karita
9,858,877 B2   1/2018   Pan
(Continued)

FOREIGN PATENT DOCUMENTS

CN   102331633 A   1/2012
CN   103733055 A   4/2014
(Continued)

OTHER PUBLICATIONS

First Chinese Office Action dated Apr. 8, 2020, received for corresponding Chinese Application No. 201810211701.8, 18 pages.
(Continued)

*Primary Examiner* — Mazda Sabouri
(74) *Attorney, Agent, or Firm* — Kinney & Lange, P.A.

(57) ABSTRACT

A detection method for a display panel motherboard and a display panel motherboard. The detection method for the display panel motherboard including a plurality of display panels arranged in a matrix includes: dividing the display panel motherboard into a plurality of detection regions, at least one detection region corresponding to at least a portion of each display panel in a same string of display panels; performing a defect detection on patterns in all the display panels in the at least one detection region.

11 Claims, 10 Drawing Sheets

(58) Field of Classification Search
CPC .... G06T 2207/30121; G01N 21/95607; G01N 2021/9513; G01N 2021/95661; G01N 21/93

See application file for complete search history.

(56) References Cited

U.S. PATENT DOCUMENTS

| | | | |
|---|---|---|---|
| 9,934,741 | B1 | 4/2018 | Pan |
| 10,210,605 | B2 | 2/2019 | Cui et al. |
| 10,274,762 | B2 | 4/2019 | Yu et al. |
| 2014/0159759 | A1 | 6/2014 | Karita |
| 2014/0212019 | A1* | 7/2014 | Lin ................. G06T 7/0004 382/141 |
| 2016/0217755 | A1 | 7/2016 | Pan |
| 2016/0307062 | A1 | 10/2016 | Cui et al. |
| 2016/0343123 | A1* | 11/2016 | Jing ................. G01N 23/083 |
| 2018/0024390 | A1 | 1/2018 | Yu et al. |
| 2018/0096664 | A1 | 4/2018 | Pan |
| 2018/0247578 | A1* | 8/2018 | Wang ................ G06T 7/33 |

FOREIGN PATENT DOCUMENTS

| | | |
|---|---|---|
| CN | 104330912 A | 2/2015 |
| CN | 104678614 A | 6/2015 |
| CN | 104792263 A | 7/2015 |
| CN | 105404041 A | 3/2016 |
| CN | 105486687 A | 4/2016 |
| CN | 107529278 A | 12/2017 |
| KR | 20050108886 A | 11/2005 |
| KR | 100662995 B1 | 12/2006 |

OTHER PUBLICATIONS

Second Chinese Office Action dated Dec. 15, 2020, for corresponding Chinese Application No. 201810211701.8.

* cited by examiner

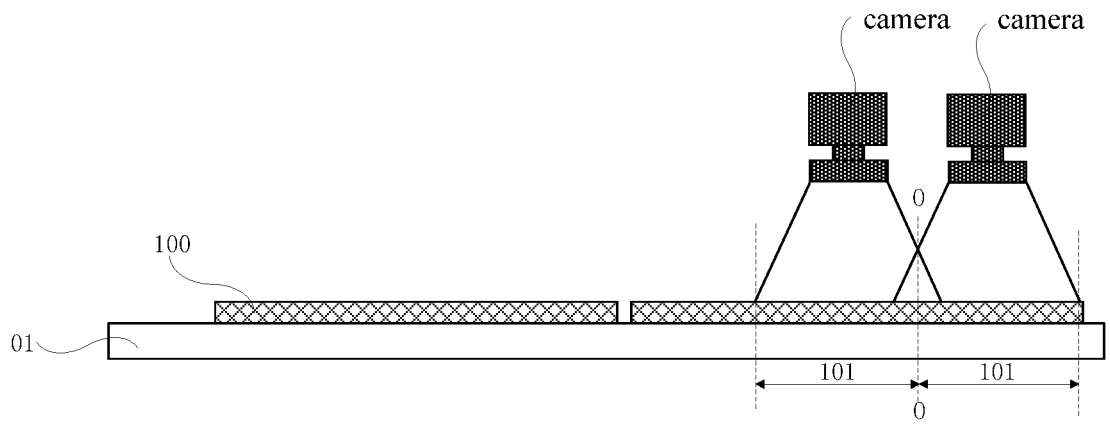

FIG. 5

```
┌─────────────────────────────────────────────────────┐
│ photographing the display panel motherboard at a    │
│ position corresponding to one detection region, and │──S201
│ acquiring a detection image of each panel to be     │
│ detected in the detection region and an actual      │
│ position of an alignment mark disposed in a         │
│ periphery of each panel to be detected in the       │
│ detection region                                    │
└─────────────────────────────────────────────────────┘
                          │
                          ▼
┌─────────────────────────────────────────────────────┐
│ acquiring positions of various pixels of each       │──S202
│ detection image in the detection region according   │
│ to the actual position of the alignment mark        │
└─────────────────────────────────────────────────────┘
                          │
                          ▼
┌─────────────────────────────────────────────────────┐
│ comparing the detection images of different panels  │──S203
│ to be detected in one and the same detection region │
│ to obtain a pattern of defect                       │
└─────────────────────────────────────────────────────┘
```

FIG. 6

DETECTION METHOD FOR DISPLAY PANEL MOTHERBOARD AND DISPLAY PANEL MOTHERBOARD

CROSS-REFERENCE TO RELATED APPLICATION

This application claims the priority benefit of Chinese Patent Application No. 201810211701.8 filed on Mar. 14, 2018 in the State Intellectual Property Office of China, the disclosure of which is incorporated herein by reference in entirety.

BACKGROUND

Technical Field

Embodiments of the present disclosure relate to the field of display technology, and in particular, to a detection method for a display panel motherboard and a display panel motherboard.

Description of the Related Art

With a rapid development of display technology, touch screen panels are gradually widely used in people's lives. At present, an On-Cell manufacturing method can be used to integrate a touch screen into a display side of a display screen.

Currently, in order to improve product quality, automatic optical inspection (AOI) technology can be used to detect defects in patterns of touch electrodes and touch leads in the touch screen. The pattern of the touch electrodes may be in a non-periodical arrangement according to design requirements. In this case, in order to improve detection accuracy for defects, it is typically required to compare touch patterns on two adjacent panels on one and the same motherboard. In this way, it raises a relatively high requirement on positioning accuracy of the panels.

SUMMARY

According to an aspect of the present disclosure, it provides a detection method for a display panel motherboard comprising a plurality of display panels arranged in a matrix, comprising:

dividing the display panel motherboard into a plurality of detection regions, at least one detection region corresponding to at least a portion of each display panel in a same string of display panels;

performing a defect detection on patterns in all the display panels in the at least one detection region.

In an alternative, performing the defect detection on the patterns in the display panels in the at least one detection region comprises:

photographing the display panel motherboard at a position corresponding to the detection region and acquiring a detection image of each display panel in the detection region;

comparing the detection images of different display panels in one and the same detection region to obtain a pattern of defect.

In an alternative, before comparing the detection images of the different display panels in one and the same detection region to obtain the pattern of defect, the detection method comprises: acquiring a plurality of detection cells each having the pattern of defect to be determined from the detection image of each display panel by using a three-point comparison method or a five-point comparison method in the same detection region;

comparing the detection images of the different display panels in one and the same detection region to obtain the pattern of defect comprises: successively comparing the detection cells at corresponding positions in the detection images of at least three adjacent display panels, excluding the detection cells having patterns of defect to be determined of a same topography, and retaining the detection cells having patterns of defect to be determined of different topographies, in the same detection region.

In an alternative, acquiring the plurality of detection cells having the patterns of defect to be determined from the detection image of each display panel by using the three-point comparison method or the five-point comparison method in the same detection region comprises:

using the three-point comparison method or the five-point comparison method to select three or five pixels having a same color from each of the plurality of detection cells having the patterns of defect, and selecting one of the pixels as a detected point and an other two or four of the pixels as reference points;

acquiring an average value of gray scales of the other two or four reference points, determining the detection cell as one having the pattern of defect when an absolute value of a difference between the average value and the gray scale of the detected point is greater than a threshold.

In an alternative, performing the defect detection on the patterns in the display panels in the at least one detection region further comprises:

acquiring, by photographing the display panel motherboard at the position corresponding to the detection region, actual positions of alignment marks disposed in a periphery of each display panel in the detection region, the alignment marks being configured to position the display panel;

acquiring positions of various pixels of each detection image in the detection region according to the actual positions of the alignment marks.

In an alternative, a projection of the at least one detection region on the display panel motherboard overlaps with a projection of at least a portion of each display panel in the same string of display panels on the display panel motherboard.

In an alternative, before acquiring the actual positions of the alignment marks disposed in the periphery of each display panel in the detection region, the detection method further comprises: acquiring a preset arrangement position of each display panel on the display panel motherboard and preset positions of the alignment marks disposed in the periphery of each display panel;

after acquiring the actual positions of the alignment mark disposed in the periphery of each display panel in the detection region and before acquiring the positions of the various pixels of the detection image of each display panel in the detection region, the detection method further comprises: performing a coordinate correction on each display panel in the detection region according to the preset arrangement position of the display panel and the preset positions and the actual position of the alignment marks.

In an alternative, before acquiring the actual positions of the alignment marks disposed in the periphery of each display panel in the detection region, the detection method further comprises: acquiring preset shapes of the alignment marks;

acquiring the actual positions of the alignment marks disposed in the periphery of each display panel in the detection region comprises: determining a pattern of the alignment marks in the detection image of each display panel according to the preset arrangement position of the display panel, the preset positions and the preset shapes of the alignment marks.

In an alternative, before acquiring the actual positions of the alignment marks disposed in the periphery of each display panel in the detection region, the detection method further comprises: acquiring preset sizes of the alignment marks;

acquiring the actual positions of the alignment marks disposed in the periphery of each display panel in the detection region comprises: determining a pattern of the alignment marks in the detection image of each display panel according to the preset arrangement position of the display panel, the preset positions and the preset sizes of the alignment marks.

In an alternative, comparing the detection images of the different display panels in one and the same detection region to obtain the pattern of defect comprises: successively comparing the pixels at corresponding positions in at least three adjacent detection images one by one to obtain the pixel having the pattern of defect, in the same detection region, the at least three adjacent detection images respectively correspond to at least three adjacent display panels.

In an alternative, comparing the detection images of the different display panels in one and the same detection region to obtain the pattern of defect comprises: successively comparing the detection cells at corresponding positions in at least three adjacent detection images one by one to obtain the detection cell having the pattern of defect, in the same detection region, the at least three adjacent detection images respectively correspond to at least three adjacent display panels.

In an alternative, an area of the detection cell in the detection image is equal to an area of 5×5 pixels in the detection image.

In an alternative, an area of the detection cell in the detection image is equal to an area of 5×5 pixels in the detection image.

According to another aspect of the present disclosure, it provides a display panel motherboard, comprising a plurality of display panels arranged in a matrix, wherein the display panel motherboard is divided into a plurality of detection regions, at least one detection region corresponding to at least a portion of each display panel in a same string of display panels;

alignment marks are provided in a periphery of each display panel in the at least one detection region for positioning the display panel.

In an alternative, at least two alignment marks are provided for each display panel in each detection region.

In an alternative, the alignment marks corresponding to one display panel are arranged in a string in each detection region.

In an alternative, the alignment marks for one display panel are located at a same side of the display panel in each detection region.

In an alternative, the display panel motherboard comprises an array substrate, an opposite substrate disposed opposite to the array substrate, and a touch substrate disposed at a side of the opposite substrate facing away from the array substrate;

the alignment marks are located on a side surface of a base substrate of the opposite substrate facing away from the array substrate; or the alignment marks are located on a side surface of the touch substrate facing away from the opposite substrate.

BRIEF DESCRIPTION OF THE DRAWINGS

In order to more clearly describe technical solutions of embodiments of the present disclosure, the drawings for illustrating the embodiments will be briefly described below. Obviously, the drawings described below are merely related to some embodiments of the present disclosure, and other drawings may be obtained by those skilled in the art based on these drawings, without creative efforts.

FIG. 5 is a schematic view of detection regions in FIG. 3 or FIG. 4;

FIG. 6 is a detailed flow chart of a step S102 in FIG. 2;

DETAILED DESCRIPTION OF EMBODIMENTS

The technical solutions of the embodiments of the present disclosure will be clearly and completely described below with reference to the accompanying drawings in the embodiments of the present disclosure. It is apparent that the described embodiments only represent a part of the embodiments of the present disclosure, rather than all of the embodiments. All other embodiments obtained by those skilled in the art based on the embodiments of the present disclosure without creative efforts fall within the scope of the present disclosure.

Figure 1:
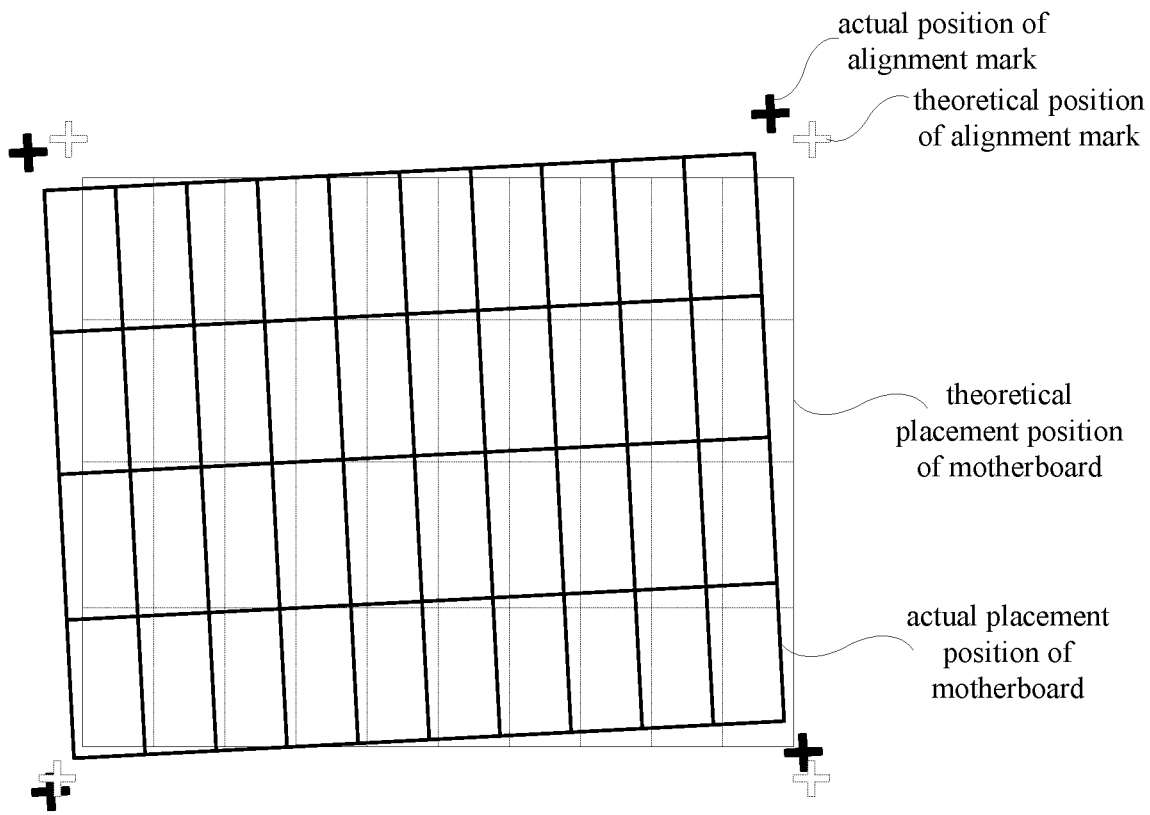
FIG. 1 is a schematic view showing an alignment manner of a display panel motherboard.

As shown in FIG. 1, a position of each panel may be determined by positioning alignment marks located at four corners of a motherboard. In this case, an actual placement position of the motherboard may be located at an offset from a theoretical placement position thereof, resulting in a relatively low positioning accuracy of the panel, which may be detrimental to detection of defects.

The embodiments of the present disclosure provide a detection method of a display panel motherboard and a display panel motherboard for solving a problem of relatively low detection accuracy for detects which is caused by the alignment implemented with alignment marks located at the four corners of the motherboard, during detection process of pattern defect. Herein, the display panel motherboard includes a plurality of display panels arranged in a matrix.

Figure 3:
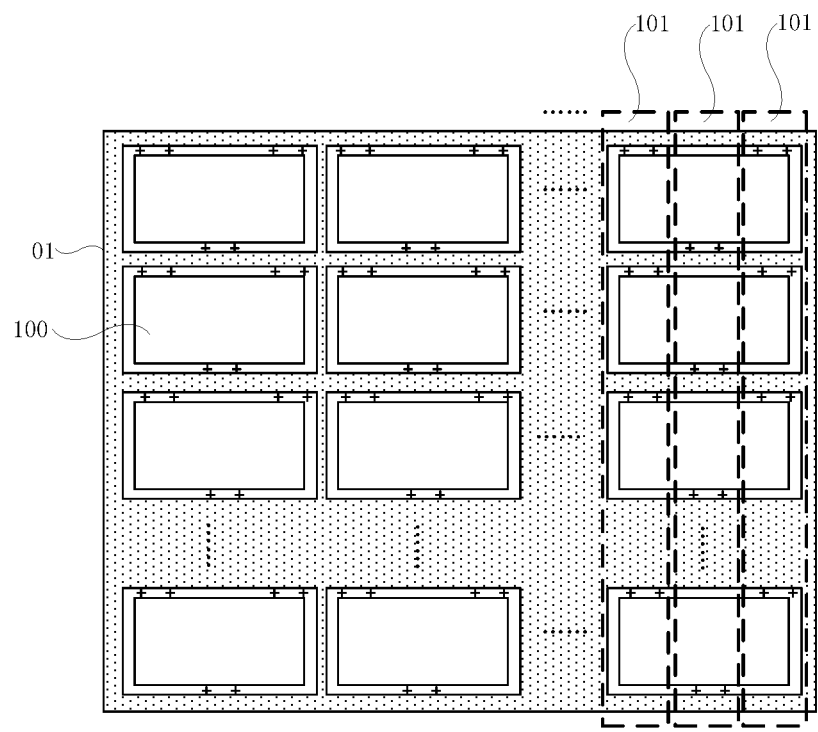
FIG. 3 is a schematic structural view of a display panel motherboard according to an embodiment of the present disclosure.
Figure 17:
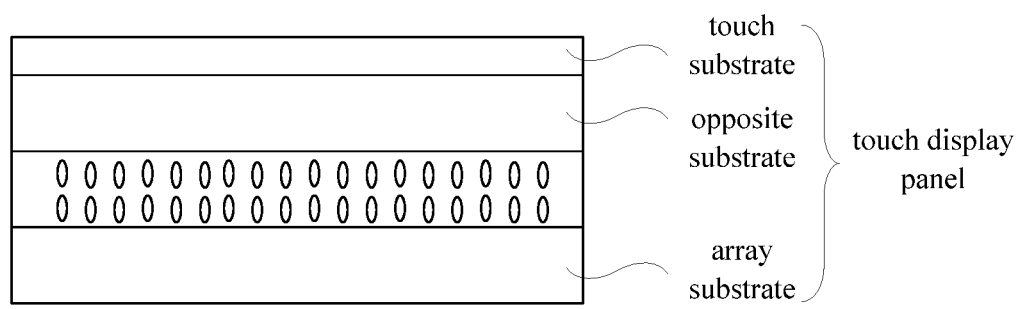
FIG. 17 is a schematic view of a display panel motherboard in a longitudinal cross-section thereof according to an embodiment of the present disclosure.

An embodiment of the present disclosure provides a detection method of a display panel motherboard. As shown in FIG. 3, the display panel motherboard 01 includes a plurality of panels 100 to be detected arranged in a matrix. In the embodiment of the present disclosure, the above-described display panel motherboard 01 may be a motherboard for an array substrate. In this case, the panel 100 to be detected in the display panel motherboard may be an array substrate. Alternatively, the above-described display panel motherboard 01 may be a motherboard for touch substrate. In this case, the panel 100 to be detected in the display panel motherboard may be a touch substrate. Alternatively, the above-described display panel motherboard 01 may further include a motherboard for an array substrate, a motherboard for an opposite substrate and a motherboard for a touch substrate stacked in sequence. In this case, the panel 100 to be detected in the display panel motherboard is a touch display panel as shown in FIG. 17. The present disclosure is not limited thereto, and the following embodiments are described by taking at least one of the above manners as an example.

Figure 2:
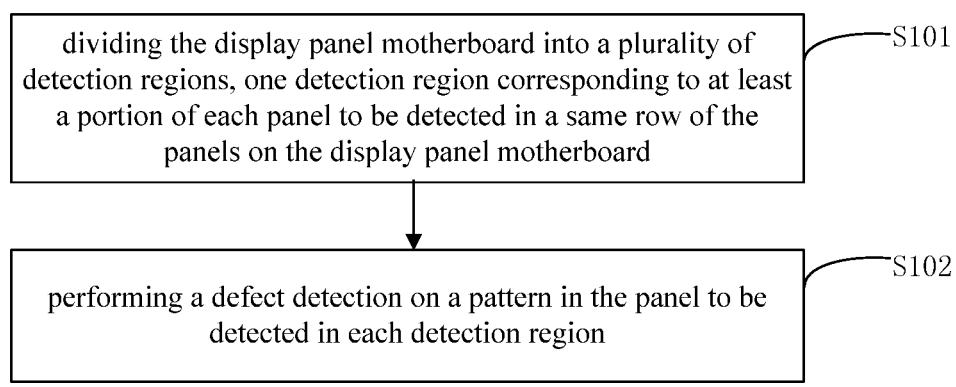
FIG. 2 is a flow chart of a detection method of a display panel motherboard according to an embodiment of the present disclosure.

Based on this, as shown in FIG. 2, the above-described detection method of the display panel motherboard includes:

S101: as shown in FIG. 3, dividing the display panel motherboard 01 into a plurality of detection regions 101, one detection region 101 corresponding to at least a portion of each panel 100 to be detected in a same row of the panels 100 on the display panel motherboard 01. It should be noted that the above same row of the panels 100 may be replaced by a same column of the panels 100, which will not be limited in the present disclosure. In other words, the display panel motherboard 01 is divided into a plurality of detection regions 101, one detection region 101 corresponding to at least a portion of each panel 100 to be detected in a same string of the panels 100 on the display panel motherboard 01. Herein, the same string of the panels 100 refers to the same row of the panels 100 or the same column of the panels 100.

Figure 4:
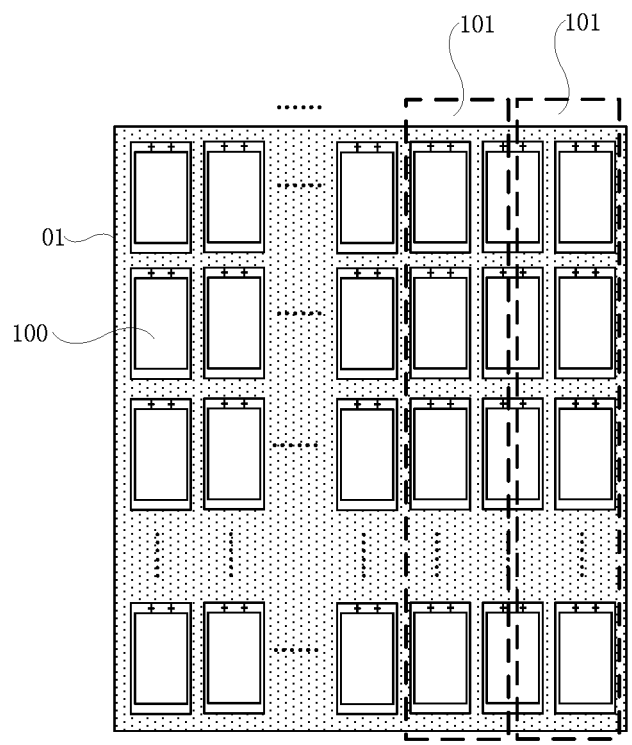
FIG. 4 is a schematic structural view of a display panel motherboard according to another embodiment of the present disclosure.

It should be noted that, as for one detection region 101 corresponding to at least a portion of each panel 100 to be detected in a same row of the panels 100 on the display panel motherboard 01, it refers to that, if a width of the detection region 101 in a horizontal direction is less than a width of the panel 100 to be detected in the horizontal direction, as shown in FIG. 3, a portion of each panel 100 to be detected in the same row of the panels 100 is located in the detection region 101. Alternatively, if the width of the detection region 101 in the horizontal direction is greater than the width of the panel 100 to be detected in the horizontal direction, as shown in FIG. 4, one detection region 101 may cover all the panels 100 to be detected in at least one row of the panels 100 to be detected.

The horizontal direction herein is explained with reference to the orientation of FIG. 3 or FIG. 4, however, the horizontal direction is defined in a relative sense, and if the orientation of the display panel motherboard 01 or the panel 100 to be detected is changed, it may refer to other directions.

In addition, the detection region 101 refers to an acquisition range of a camera, and all the detection regions 101 may cover all the panels 100 to be detected on one display panel motherboard 01. Thereby, a shooting range of the camera may cover the entire display panel motherboard 01. Based on this, in order to photograph and acquire all the panels 100 to be detected on a complete display panel motherboard 01, one camera may be adopted to photograph different detection regions 101 one by one in the horizontal direction. In addition, in case that the manufacturing cost is under control, it is also possible to simultaneously photograph different detection regions 101 by using a plurality of cameras, which is not limited in the present disclosure.

On the basis of this, in order to avoid the occurrence of non-detection zone, as shown in FIG. 5, two adjacent detection regions 101 may have an overlapping portion therebetween. However, in order to avoid interference of detection data of different detection regions 101, the overlapping portion may be divided along a center line (O-O) of the overlapping portion, wherein a left half region of the overlapping portion belongs to a left detection region 101, and a right half region of the overlapping portion belongs to a right detection region 101.

Herein, the terms "horizontal", "vertical", "left", "right" and the like are defined with respect to the orientation of the display panel motherboard 01 which is schematically placed in the drawings. It should be understood that these directional terms are defined to be relative concepts, they are used for ease of description and clarification, and they may accordingly vary according to the change of the orientation of the display panel motherboard 01 placed.

S102: performing a defect detection on a pattern in the panel 100 to be detected in each detection region 101.

It should be noted that, in the defect detection method according to the embodiment of the present disclosure, the pattern to be detected is not limited. For example, in case that the panel 100 to be detected is the above touch substrate or touch display panel, the pattern may refer to a pattern of touch electrode or touch lead. Alternatively, in case that the panel 100 to be detected is the above array substrate, the pattern to be detected may refer to a pattern of gate line or data line. Furthermore, the above pattern may be periodically distributed, or non-periodically distributed. The present disclosure does not raise a limitation to this. Hereinafter, for convenience of description, a non-periodic pattern of touch electrode or touch lead is taken as an example to describe the above-described pattern.

Figure 7A:
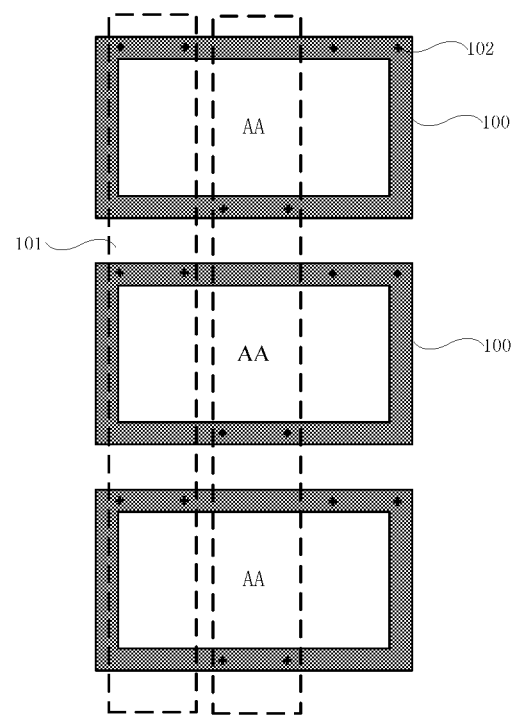
FIG. 7a is a schematic view showing a structure of three panels which are arranged sequentially adjacent to one another and configured to be detected in a same detection region of FIG. 4.
Figure 7B:
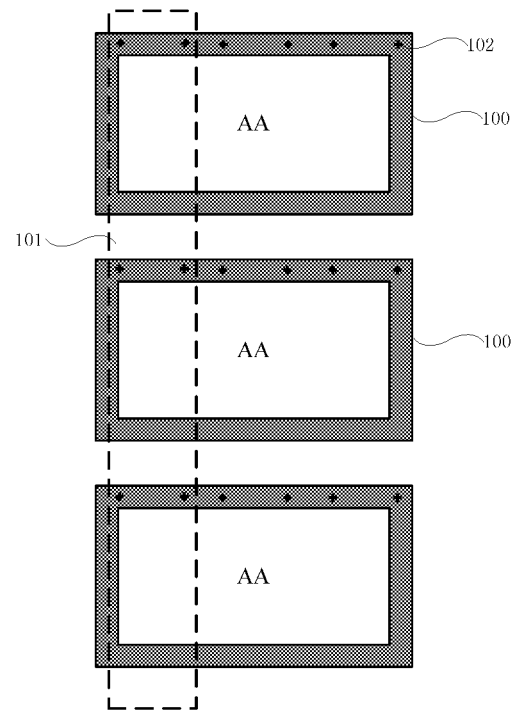
FIG. 7b is a schematic view showing another structure of three panels which are arranged sequentially adjacent to one another and configured to be detected in a same detection region of FIG. 4.

As shown in FIG. 6, the above-described step S102 includes:

S201: photographing the display panel motherboard 01 at a position corresponding to one detection region 101, and acquiring a detection image of each panel 100 to be detected in the detection region 101 and an actual position of an alignment mark 102 disposed in a periphery of each panel 100 to be detected in the detection region, as shown in FIG. 7a or FIG. 7b.

The alignment mark 102 in the periphery of each panel 100 to be detected is configured to position the panel 100 to be detected.

The periphery of the panel 100 to be detected refers to a region located around an active area (AA) of the panel 100 to be detected, wherein the active area of the panel 100 to be detected is arranged to correspond to a region in a display device capable of displaying image.

In addition, the alignment mark 102 of each panel 100 to be detected may be set in such a manner that each panel 100 to be detected corresponds to at least two alignment marks 102 in each detection region 101, as shown in FIG. 7a or FIG. 7b. In this way, in one detection region 101, coordinate and arrangement angle of the panel 100 to be detected may be determined by at least two alignment marks 102, thereby improving the accuracy in determining the position of the panel 100 to be detected.

On the basis of this, in the process of determining the position of the panel 100 to be detected, in order to reduce difficulty in identifying the alignment mark 102 and determining the position of the alignment mark 102, the above-mentioned alignment mark 102 may be regularly arranged. For example, in each detection region 101, the alignment marks 102 corresponding to one panel 100 to be detected are arranged in a row. Furthermore, in each detection region 101, the alignment marks 102 for one panel 100 to be detected are located at a same side of the panel 100 to be detected. For example, as shown in FIG. 7a, in a detection region 101, the alignment marks 102 corresponding to each panel 100 to be detected are all located in an upper side of the peripheral of the panel 100 to be detected. In addition, in another detection region 101 adjacent to the detection region 101, the alignment marks 102 corresponding to each panel 100 to be detected are all located in a lower side of the peripheral of the panel 100 to be detected. In this case, the detection regions 101 may be successively photographed by using a single camera.

Alternatively, as shown in FIG. 7b, the alignment marks of the panels 100 to be detected located in the same row in two adjacent detection regions 101 may be arranged in the same manner. In this case, a plurality of cameras may be used to simultaneously photograph different detection regions 101 from top to bottom.

S202: acquiring positions of various pixels of each detection image in the detection region 101 according to the actual position of the alignment mark 102.

It should be noted that, the above-described detection image refers to a plurality of gray scale images obtained by the camera or cameras photographing the display panel motherboard 01 in the detection region 101, and each gray scale image corresponds to at least a portion of one display panel which is photographed in the detection region 101.

Based on this, a resolution of the above detection image is determined by a resolution of the camera or cameras.

S203: comparing the detection images of different panels 100 to be detected in one and the same detection region 101 to obtain a pattern of defect.

It should be noted that, when the detection images of each two panels 100 to be detected in the same detection region 101 are compared, if it is found that different points appear in the detection images, it may not be determined which one of the detection images is defective. Therefore, when the detection images of the different panels 100 to be detected are compared, the detection images of at least three adjacent panels 100 to be detected in the same detection region 101 are successively compared.

It may be seen from the above that, in the detection method according to the embodiments of the present disclosure, a plurality of detection regions 101 may be photographed by one camera, or different detection regions 101 may be simultaneously photographed by a plurality of cameras, and then the detection images of the different panels 100 to be detected which are photographed in the same detection region 101 are compared, to acquire the pattern of effect, thereby achieving the purpose of defect detection. On the basis of this, in the embodiments of the present disclosure, each panel 100 to be detected in the detection region 101 is provided with the alignment marks 102, therefore the camera may photograph the alignment marks 102 corresponding to each panel 100 to be detected while photographing the detection region 101. In this way, the actual positions of the alignment marks 102 may be obtained, thereby determining the position of the panel 100 to be detected on which the alignment marks 102 are located by using the alignment marks 102. In this case, when the position of the panel 100 to be detected is determined, the position of each pixel or region in the detection image of the panel 100 to be detected may also be determined. In this way, in the process of comparing the detection images of the different panels 100 to be detected in the same detection region 101, it is necessary to compare the corresponding pixels or the corresponding regions of the different detection images. Since the accuracy in determining the positions of the pixels or the regions in the detection images is improved, the alignment accuracy of each pixel or region of the different detection images may be increased during the comparison process, thereby preventing the occurrence of false detection or missing detection and improving the detection accuracy of defect.

Figure 8:
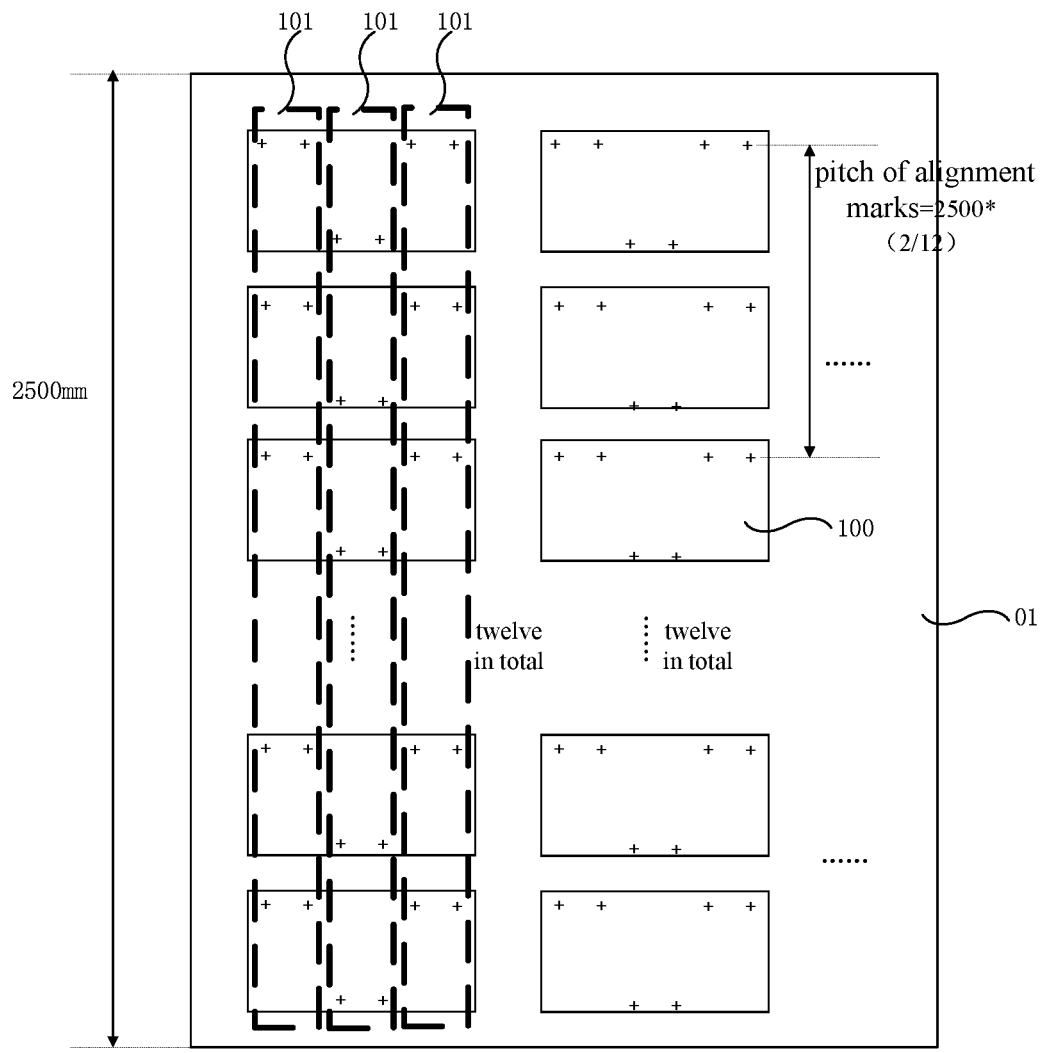
FIG. 8 is a schematic view showing pitches of alignment marks in a display panel motherboard having the display panels shown in FIG. 7a or FIG. 7b.

Specifically, when the alignment of each panel 100 to be detected in the display panel motherboard 01 is performed by using the alignment marks at the four corners of the display panel motherboard 01 as shown in FIG. 1, a distance between the upper and lower alignment markers and a length of the display panel motherboard 01 in a vertical direction are for example 2500 mm (taking a 15.6" product as an example). In the embodiments of the present disclosure, corresponding alignment marks for different panels 100 to be detected located in the same detection region 101 may be photographed. To take an example of comparing the detection images of three adjacent panels 100 to be detected, as shown in FIG. 8, a distance between an alignment mark 102 of a first panel 100 to be detected and an alignment mark 102 of a third panel 100 to be detected is relatively short, about 2500×(2/12)=416.7 mm. Herein, the numerical value "12" in the formula indicates that 12 panels 100 to be detected are distributed on the display panel motherboard 01 in the vertical direction. The numerical value "2" indicates that there are two pitches of the panels 100 to be detected between the first panel 100 to be detected and the third panel 100 to be detected in the vertical direction, among the three adjacent panels 100 to be detected.

As can be seen from the above, the space between the alignment marks 102 in the vertical direction is reduced, thereby the accuracy in determining the position of the panel 100 to be detected by the alignment marks 102 may be improved. When the detection method according to the embodiments of the present disclosure is used, as shown in FIG. 9, it may be seen from an enlarged view of a partial region at a corresponding position of the detection images of the three adjacent panels 100 to be detected in the same detection region 101 that, the positions of lead patterns in the partial region of the detection images of the three different panels 100 to be detected substantially corresponds to one another.

Figure 9:
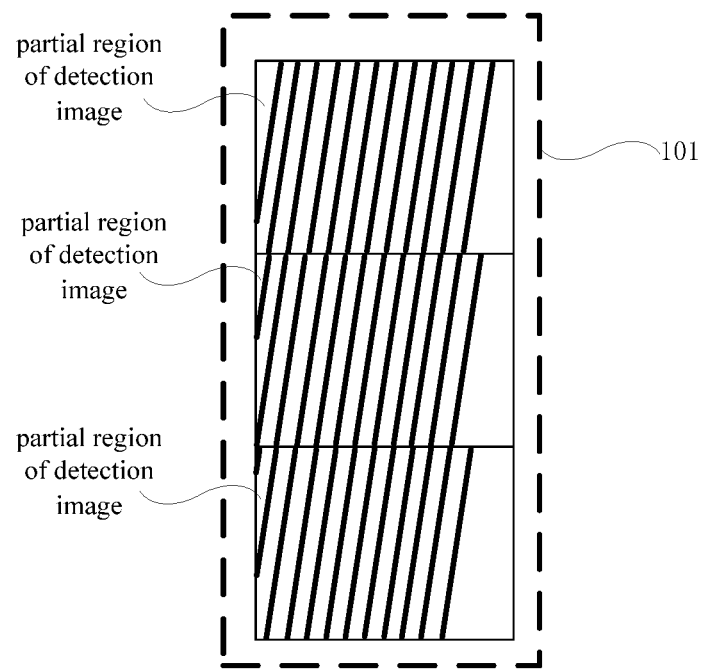
FIG. 9 is a schematic view of an alignment effect of a detection method according to an embodiment of the present disclosure.

It should be noted that, if the panel 100 to be detected is an array substrate, the pattern in the detection image shown in FIG. 9 may be a pattern of a lead in the periphery of the active area of the array substrate; alternatively, if the panel 100 to be detected is a touch substrate or a touch display panel, the pattern in the detection image shown in FIG. 9 may be a pattern of touch leads in the periphery of the active area of the touch substrate or the touch display panel.

On the basis of this, in order to improve the accuracy in determining the position of the panel 100 to be detected by the alignment marks 102, a coordinate correction may be performed on the panel 100 to be detected by setting a preset position of the panel 100 to be detected and an actual position of the panel 100 to be detected.

Specifically, before acquiring the actual positions of the alignment marks 102 corresponding to each panel 100 to be detected in the detection region 101, the detection method further includes: obtaining a preset arrangement position of each panel 100 to be detected on the display panel motherboard 01 and preset positions of the alignment marks 102 of each panel 100 to be detected.

The preset arrangement position on the display panel motherboard 01 and the preset positions of the alignment marks 102 may be set by an operator in an inspection parameter editing recipe of an AOI.

In this case, in order to acquire the actual positions of the alignment marks 102, it is also necessary to photograph and identify the alignment marks 102 while the camera photographs the detection region 101. The identification of the alignment marks 102 will be exemplified below.

For example, the alignment marks 102 may be identified from the photographed detection image based on the shapes of the alignment marks 102.

Specifically, a preset shape of each alignment mark 102 may be set in the recipe of the AOI. For example, the preset shape may be a crisscross, a triangle, a diamond, or the like. Then, the preset shape of each alignment mark 102 is obtained from the above recipe.

Next, after the detection region 101 is photographed by the camera, the pattern of the alignment marks 102 in the detection image of each panel 100 to be detected may be determined according to the preset arrangement position of the panel 100 to be detected, the preset positions and the preset shapes of the alignment marks 102 obtained from the recipe. For example, a pattern identical to the preset shape of one of the alignment marks 102 may be identified from a pattern at a position corresponding to one of the preset positions of the alignment marks 102 in the above-described detection image.

Alternatively, for example, the alignment mark(s) 102 may be identified from the photographed detection image based on the size of the alignment mark(s) 102.

Specifically, a preset size of the alignment marks 102 may be set in the recipe of the AOI, e.g., it reflects a pattern whose area is equal to for example a certain value.

Next, after the detection region 101 is photographed by the camera, the pattern of the alignment marks 102 in the detection image of each panel 100 to be detected may be determined according to the preset arrangement position of the panel 100 to be detected, the preset positions and the preset sizes of the alignment marks 102 obtained from the recipe. For example, a pattern identical to the preset size of one of the alignment marks 102 may be identified from a pattern at a position corresponding to one of the preset positions of the alignment marks 102 in the above-described detection image.

In this case, the actual positions of the alignment marks 102 may be achieved by the identification of the alignment marks 102. Next, the coordinate correction may be performed on each panel 100 to be detected in the detection region 101 according to the preset arrangement position of the panel 100 to be detected and the preset positions and the actual positions of the alignment marks 102.

Specifically, a deflection angle and a displacement of each alignment mark 102 may be obtained according to the preset position of the alignment mark 102 of the panel 100 to be detected and the actual position of the alignment mark 102 of the panel 100 to be detected. Then, according to the preset arrangement position of the panel 100 to be detected in combination with the deflection angle and the displacement of the alignment mark 102, the actual arrangement position of the panel 100 to be detected may be derived, thereby completing the coordinate correction of the panel 100 to be detected. In this case, after completing the coordinate correction of the panel 100 to be detected, the coordinates of the pixels in the detection image of the panel 100 to be detected, which is photographed by the camera, may also be accurately known.

Based on this, after the coordinates of the pixels in the detection image of each panel 100 to be detected in the detection region 101 are determined, image of defect may be acquired by comparing different detection images.

Specifically, an embodiment of the present disclosure provides a detection method as follows: for example, a detection mode of Panel To Panel (display panel) may be adopted.

Specifically, in the step S203, it includes: in the same detection region 101, successively comparing the pixels at corresponding positions in at least three adjacent detection images one by one to obtain the pixel(s) having the pattern of defect, the at least three adjacent detection images respectively corresponding to at least three adjacent panels 100 to be detected.

When the above detection mode of Panel To Panel is used, the sizes, the gray scale datum of the pixels at corresponding positions in the detection images of each two different panels 100 to be detected in the three adjacent panels 100 to be detected in the same detection region 101 are collected, compared, and processed by calculation, one by one. Since the coordinates of the pixels in the detection image may be acquired more accurately in the embodiments of the present disclosure, the phenomenon of false detection or missing detection for defect due to pixel misalignment may be reduced during the comparison process.

Figure 10:
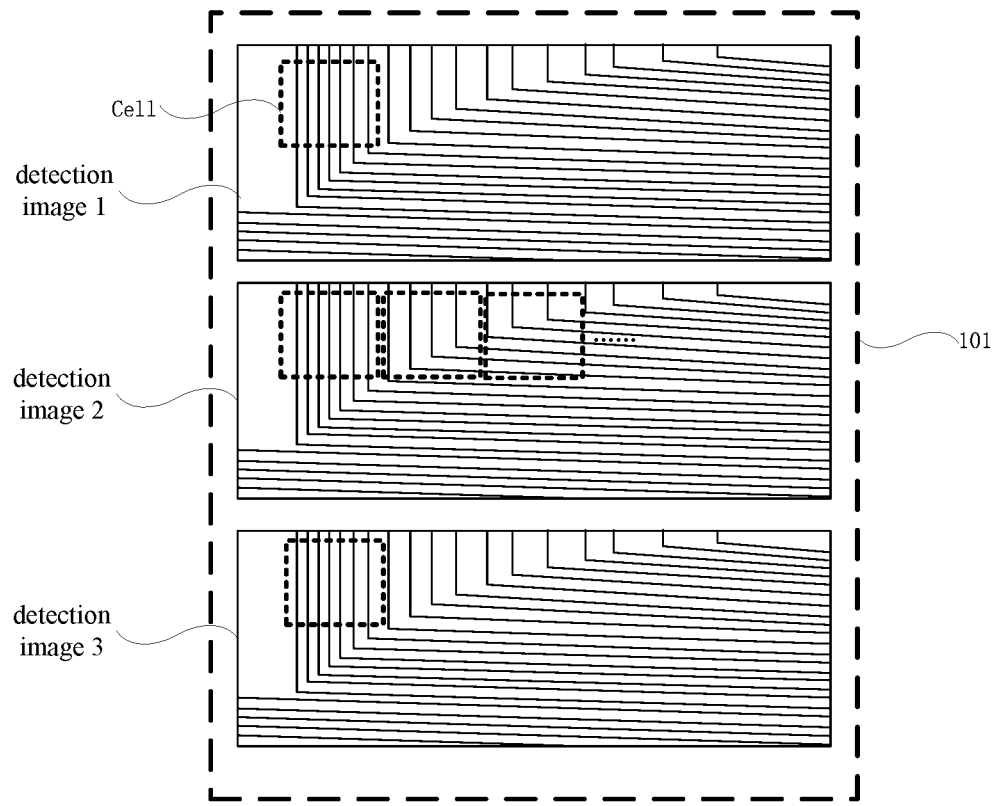
FIG. 10 is a schematic view showing a defect comparison manner according to an embodiment of the present disclosure.

A smallest unit in the above comparison process is one pixel of the detection image, therefore the amount of calculation in the comparison process is relatively large. An embodiment of the present disclosure also provides another detection method:

For example, as shown in FIG. 10, a detection method of Cell To Cell (detection cell) is adopted. It should be noted that, if the panel 100 to be detected is an array substrate, the pattern in the detection image shown in FIG. 10 may be a pattern of a lead in the periphery of the active area of the array substrate; alternatively, if the panel 100 to be detected is a touch substrate or a touch display panel, the pattern in the detection image shown in FIG. 10 may be a pattern of a touch lead in the periphery of the active area of the touch substrate or the touch display panel.

Specifically, in the step S203, it includes: in the same detection region 101, successively comparing the detection cells at corresponding positions in at least three adjacent detection images one by one to obtain the pixel having the pattern of defect, the at least three adjacent detection images respectively corresponding to at least three adjacent panels 100 to be detected.

This detection method is different from the above detection method in that, a plurality of detection cells are divided in the detection image, and each detection cell includes a plurality of pixels. Optionally, an area of the detection cell is equal to an area of 5×5 pixels in the detection image, for example, the area of one pixel=3.5 μm×3.5 μm.

In this case, when the above detection mode of Cell To Cell is used, the sizes, the gray scale datum of the detection cells at corresponding positions in the detection images of each two different panels 100 to be detected in the three adjacent panels 100 to be detected in the same detection region 101 are collected, compared, and processed by calculation, one by one. Since the coordinates of the pixels in the detection image may be acquired more accurately in the embodiments of the present disclosure, the phenomenon of false detection or missing detection for defect due to pixel misalignment may be reduced during the comparison process. In addition, since the area of the detection cell is larger than the area of the pixel in the detection image, the amount of calculation in the detection mode of Cell To Cell is smaller than that in the detection mode of Panel To Panel.

It can be seen from the above that the above two detection modes both need to compare the corresponding pixels or the corresponding detection cells in different detection images one by one. If the size of the panel 100 to be detected is relatively large, it will still take a relatively longer time for the above comparison process, and the amount of calculation is also relatively large. Therefore, an embodiment of the present disclosure also provides another detection mode, which is a combination of the detection mode of Cell To Cell and the detection mode of Panel To Panel:

As for a defect detection of a non-periodic product, in the embodiment of the present disclosure, it combines the detection mode of Cell To Cell with the detection mode of Panel To Panel. Specifically, the non-periodic product substrate includes a periodic region and a non-periodic region; the defect of a single panel is detected by the detection mode of Cell To Cell, wherein the defect the periodic region is a true defect, and the defect detected in the non-periodic region may be a fake defect; then, three pieces of panels are compared by using the detection mode of Panel To Panel to exclude the fake defect. In this way, it avoids the issues of complicated manner and large processing amount due to the usage of a single detection mode of Panel To Panel, in which all pixels are compared. Therefore, it improves efficiency by combining the two detection modes. Herein, the non-periodic product refers to a product with non-periodically distributed patterns (for example, patterns of touch electrodes or touch leads), the periodic region refers to a region in which the patterns are periodically distributed, and the non-periodic region refers to a region in which the patterns are non-periodically distributed.

Firstly, acquiring a plurality of detection cells each having the pattern of defect from the detection image of each display panel by using a three-point comparison method or a five-point comparison method in the same detection region.

Next, after acquiring the plurality of detection cells having the pattern of defect from the detection image of each panel 100 to be detected in the same detection region 101, the above-mentioned combination of the detection mode of Cell To Cell and the detection mode of the Panel To Panel includes:

in the same detection region 101, successively comparing the corresponding detection cells in the detection images of at least three adjacent panels 100 to be detected, excluding the detection cells having patterns of defect of a same topography, and retaining the detection cells having patterns of defect of different topographies.

Figure 11A:
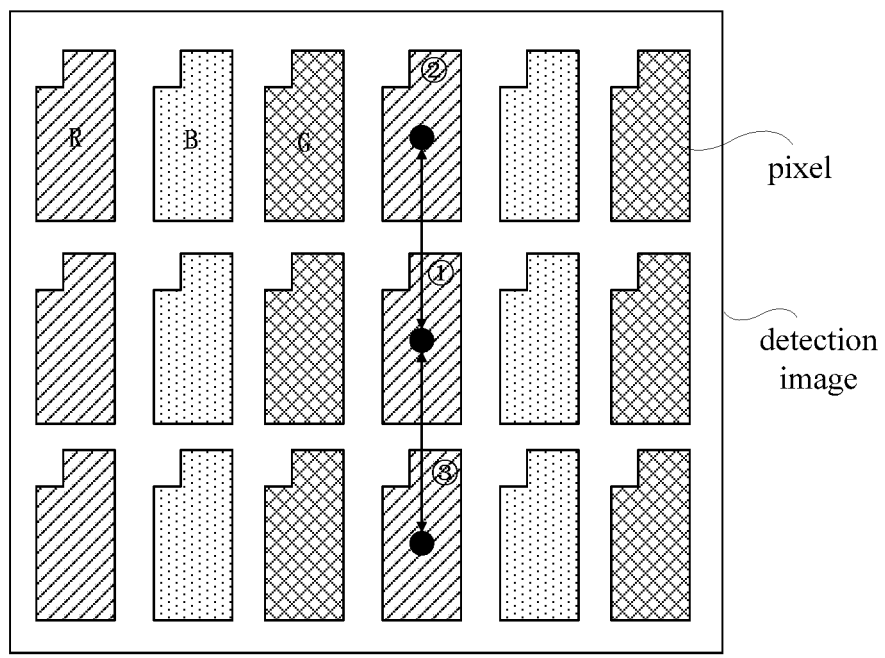
FIG. 11a is a schematic view of a three-point comparison method according to an embodiment of the present disclosure.
Figure 11B:
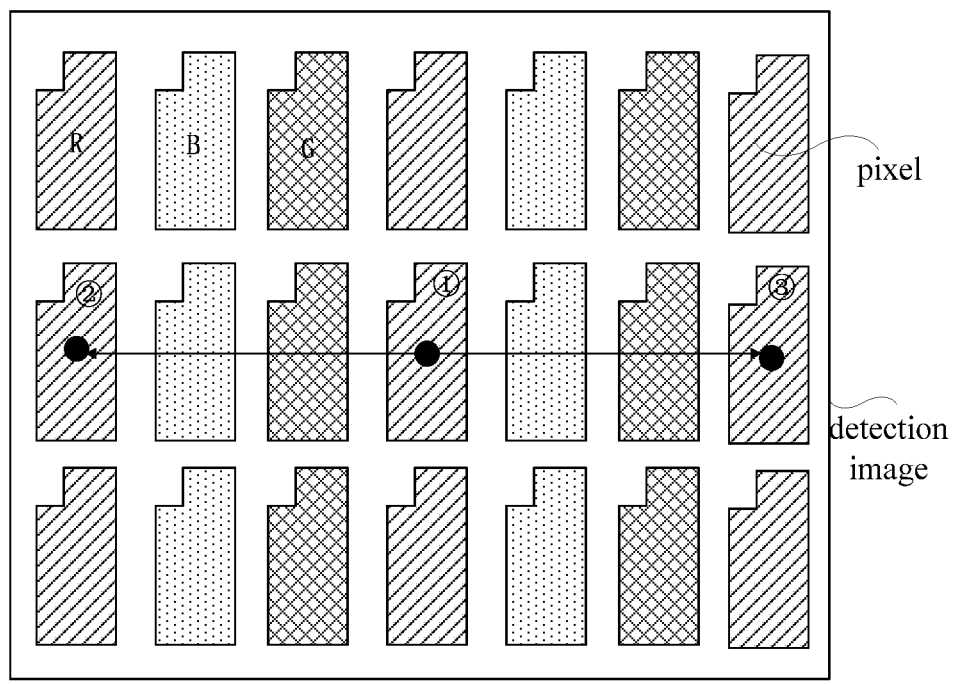
FIG. 11b is a schematic view of a three-point comparison method according to another embodiment of the present disclosure.

The three-point comparison method is shown in FIG. 11a or FIG. 11b, three pixels of the same color which are close to each other are selected in the detection image, wherein the pixel ① serves as a detected point, and the pixel ② and the pixel ③ serve as reference points. At this time, an average value of the gray scales of the pixels ② and ③ is compared with the gray scale of the detected point.

Specifically, if |the gray scale of the pixel ①-average value |>threshold, it is determined that the pixel is a defect point, and the detection cell in which the pixel ① is located is a detection cell having the pattern of defect. If |the gray scale of the pixel ①-average value |<threshold, it is determined that the pixel ① is a normal point, and the detection cell in which the pixel ① is located is a normal detection cell.

In the above three-point comparison method, as shown in FIG. 11a, the detected point and the two reference points may be arranged longitudinally, that is, three pixels of the same color which are close to each other in a longitudinal direction are selected. Alternatively, as shown in FIG. 11b, the detected point and the two reference points may be arranged transversely, that is, three pixels of the same color which are close to each other in a traversal direction are selected. It is not limited in the present disclosure.

Figure 12:
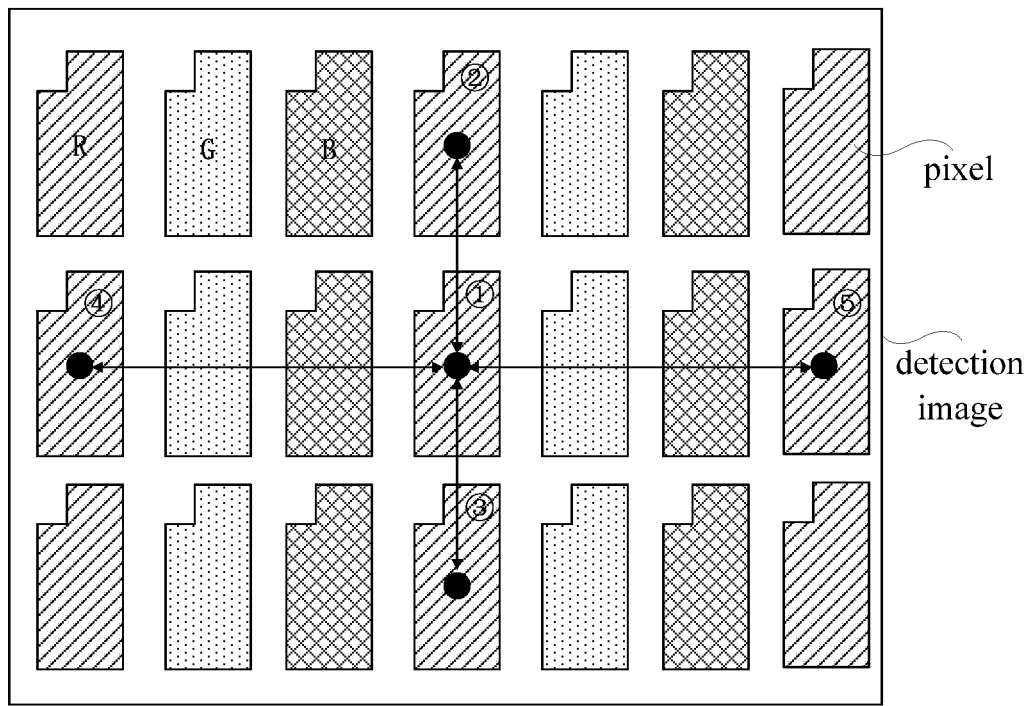
FIG. 12 is a schematic view of a five-point comparison method according to an embodiment of the present disclosure.

In addition, the five-point comparison method is the same as the three-point comparison method in terms of principle. As shown in FIG. 12, it only needs to select two more pixels as reference points near the pixel where the detected point is located, that is, pixel ④ and pixel ⑤.

Figure 13:
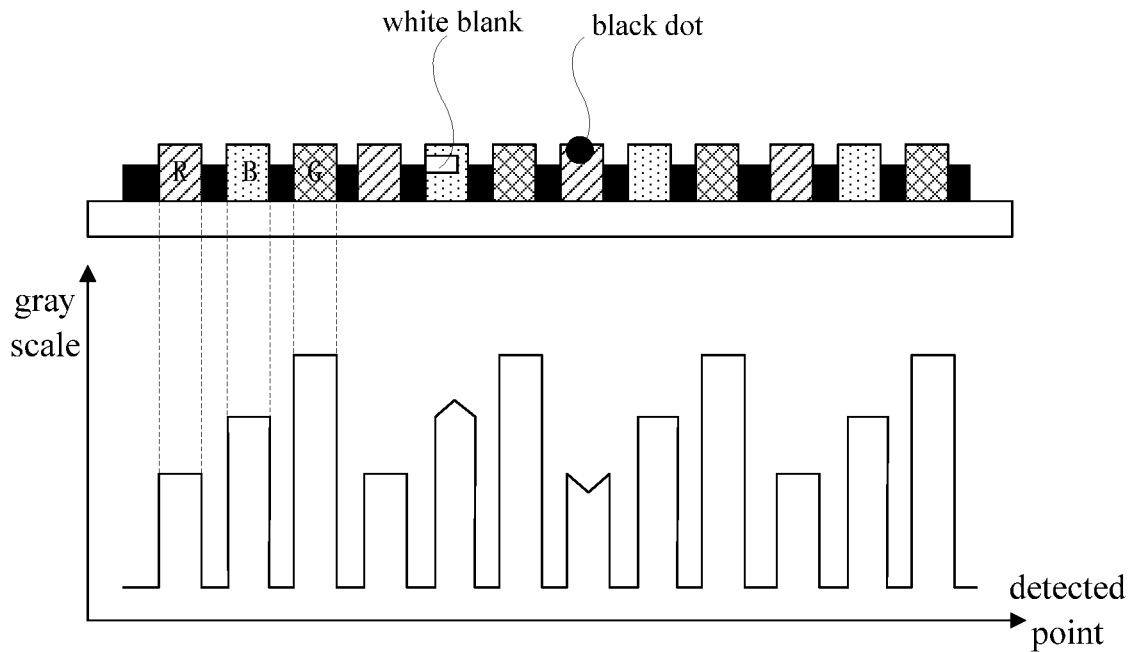
FIG. 13 is a gray scale distribution view of detected points obtained by using the methods shown in FIG. 11a, FIG. 11b or FIG. 12.

In this case, as shown in FIG. 13, the defects may be divided into white blanks and black dots. For example, if the panel 100 to be detected is an array substrate or a touch substrate, since the array substrate or the touch substrate is a single layer of substrate, each white blank may indicate that the pattern on the array substrate or the touch substrate is broken there, so that the light is transmitted. Therefore, the gray scale of the pixel having the white blank is higher than that of a normal pixel having the same color (for example, blue B). In addition, each black dot indicates that the pattern on the array substrate or the touch substrate has foreign matter there, so that the light is blocked. Therefore, the gray scale of the pixel having the defect of black dot is lower than that of a normal pixel having the same color (for example, red R).

Alternatively, for example, if the panel 100 to be detected is a touch display panel composed of an array substrate, an opposite substrate, and a touch substrate stacked in sequence, light and dark of the light reflected at the defect position does not directly reflect the type of the defect due to the stacking of the above various substrates. Thus, the above white blank and black spot may only represent the position of the defect. The staff may further analyze the type of defect based on the position of the defect.

Figure 14:
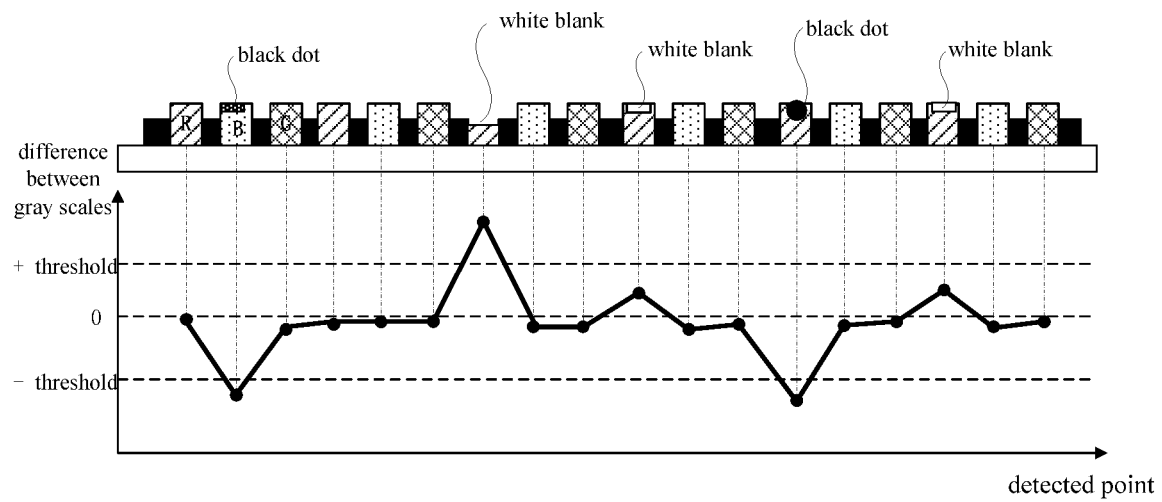
FIG. 14 is a distribution curve of differences between gray scales of detected points obtained by using the methods shown in FIG. 11a, FIG. 11b or FIG. 12 and an average value of gray scales of reference points.

Based on this, FIG. 14 shows a distribution curve of differences between the gray scales of different detected points and the gray scales of the reference points in the detection image. It may be seen that there are many detected points with defects, and it is only necessary to classify the detection cells in each of which the difference of gray scale between the detected point and the reference point is larger than the threshold into the detection cells having the pattern of defect.

The threshold may be set according to computing capability, detection accuracy, production practice requirement and the like of the detection device. For example, if it is required to improve the detection accuracy for defect, the magnitude of the above threshold may be reduced, and if it is required to increase production speed, the magnitude of the above threshold may be increased.

Figure 15:
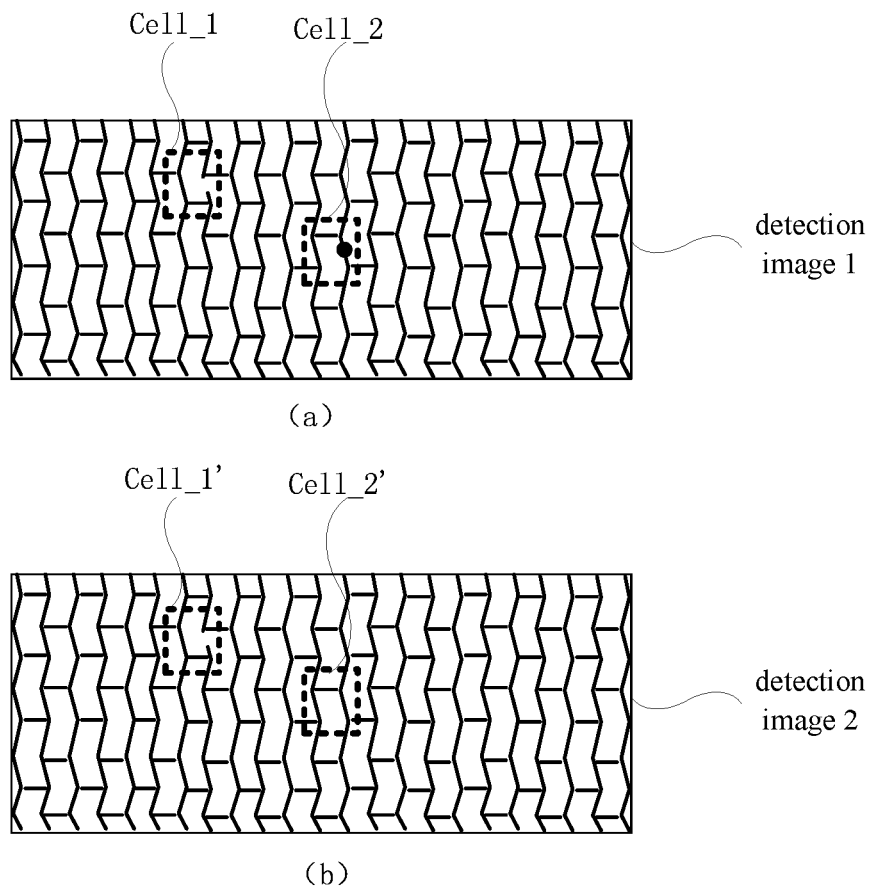
FIG. 15 is a schematic view of a defect comparison manner according to another embodiment of the present disclosure.

Specifically, as an example, a touch substrate or a touch display panel serves as the panel 100 to be detected, as shown in FIG. 15 (a) or FIG. 15 (b), then the obtained pattern in the detection image is a pattern of a touch electrode in the touch substrate or the touch display panel. Based on this, when the detection cells at corresponding positions in the detection images of each two adjacent panels 100 to be detected in the at least three adjacent panels 100 to be detected are compared, as shown in FIG. 15 (a) or FIG. 15 (b), the defect in the detection cell_1 in the detection image 1 and the defect in the detection cell_1' at the corresponding position in the detection image 2 are white blanks, and the topographies of the white blanks are the same. Therefore, it may be preliminarily considered that the defects are of a conventional design, that is, false defects. Then, one of the detection images is compared with the other one detection image of the at least three adjacent panels 100 to be detected, or the detection cells at corresponding positions in the detection images of the other panels 100 to be detected are compared. If the defects still have the same topography, it may be determined that the above defects are of a conventional design.

Alternatively, when the corresponding detection cells in the detection images of each two adjacent panels 100 to be detected in the at least three adjacent panels 100 to be detected are compared, it can be seen that the defect in the detection cell_1 in the detection image 1 is a black dot, while there is no defect in the detection cell_2' at the corresponding position in the detection image 2, thus it may be considered that the defect in the detection cell_2 in the detection image 1 is a true defect, and it is necessary to record the location and the topography feature of the detect in the Distributed File System (DFS) of the AOI, and upload them.

In this way, in this detection method, the detection cell(s) having the pattern of defect may be quickly obtained in the detection image of the panel 100 to be detected by the three-point comparison method or the five-point comparison method, and then the true defect and the false defect may be identified and screened by the above comparison mode of Cell To Cell. Since this detection method does not need to compare the pixels or regions at corresponding positions in different detection images one by one, the comparison process and the amount of calculation can be simplified, thereby improving detection speed for defect and reducing calculation power consumption of the device.

It should be noted that the area of the detection cell in this detection method may be equal to the area of 5×5 pixels in the detection image.

In addition, in the touch electrodes shown in FIG. 15 (a) or (b), the transversely distributed sub-electrodes and the longitudinally distributed sub-electrodes may be respectively located in different layers. Alternatively, they may be disposed in the same layer, in this case, the display panel having the pattern of this touch electrode is of a single layer on cell (SLOC) structure.

Figure 16:
FIG. 16 is a schematic view of a computer device according to an embodiment of the present disclosure.

An Embodiment of the present disclosure provides a computer device, including a memory, a processor. The memory stores a computer program executable on the processor, and the computer program is configured to implement the detection method according to any one of the above embodiments when executed by the processor, as shown in FIG. 16. The computer device has the same technical effects as the detection method for the display panel motherboard according to the foregoing embodiments, therefore they will not be described herein again. The memory may include a ROM, a RAM, a magnetic disk, an optical disk or any other mediums that can store program codes.

An embodiment of the present disclosure provides a computer readable medium storing a computer program that, wherein the computer program is configured to implement the detection method according to any one of the above embodiments when executed by the processor. The computer readable medium has the same technical effects as the detection method for the display panel motherboard according to the foregoing embodiments, therefore they will not be described herein again.

It will be appreciated by those skilled in the art that the present disclosure includes a device(s) for performing one or more operations described in this disclosure. These devices may be specially designed and manufactured for the required purposes, or may also include known devices in a general purpose computer. These devices have computer programs stored therein that are selectively activated or reconfigured. Such computer programs may be stored in a readable medium for a device (for example, computer) or stored in any type of mediums that are suitable storing electronic instructions and respectively coupled to buses, including but not limited to any types of disks (including a floppy disk, a hard disk, an optical disk, a CD-ROM, and a magneto-optical disk), a ROM (Read-Only Memory), a RAM (Random Access Memory), a EPROM (Erasable Programmable Read-Only Memory), a EEPROM (Electrically Erasable Programmable Read-Only Memory), a flash memory, a magnetic card or a light card. That is, the readable medium includes any mediums that can store or transmit information in a readable form.

In the embodiments of the present disclosure, the terms "controller" and "thermostat" may be implemented by one or more logical operation processing circuits, which may be embodied as a processor, for example, a Central Processing Unit (CPU), referred to as CPU), an Application Specific Integrated Circuit (ASIC), a Digital Signal Processor (DSP), a Field Programmable Gate Array (FPGA), a Single-Chip Microcomputer (MCU) or the like. The term "storage device" may be one or more storage elements, for example, a random access memory (RAM), a non-volatile memory, a magnetic disk storage, a flash, or the like.

An embodiment of the present disclosure provides a display panel motherboard 01. As shown in FIG. 3, the display panel motherboard includes a plurality of panels 100 to be detected arranged in a matrix.

The display panel motherboard 01 is divided into a plurality of detection regions 101. One detection region 101 corresponds to at least a portion of each panel 100 to be detected in the same row of panels 100 to be detected.

In addition, in the detection region 101, as shown in FIG. 7a or FIG. 7b, alignment marks 102 are provided in a periphery of each panel 100 to be detected for positioning the panel 100 to be detected. The display panel motherboard 01 has the same technical effects as the display panel motherboard 01 according to the foregoing embodiments, therefore they will not be described herein again. The setting manner of the alignment mark 102 is the same as that described above, therefore it will not be described herein again.

Based on this, as shown in FIG. 17, the display panel motherboard 01 includes an array substrate, an opposite substrate disposed opposite to the array substrate, and a touch substrate disposed at a side of the opposite substrate facing away from the array substrate.

In this case, the alignment marks 102 may be located on a side surface of the opposite substrate facing away from the array substrate. Alternatively, the alignment mark 102 may be located on a side surface of the touch substrate facing away from the opposite substrate. The alignment marks 102 may be formed by a photolithography process, and the material for forming the alignment marks 102 may be a material commonly used in the manufacturing process of the display panel, for example, a gate metal material, a source metal material, or the like.

It should be noted that the above-described opposite substrate may include a color filter layer. In this case, the opposite substrate may be a color filter substrate. In addition, the above-described color filter layer can also be manufactured on the array substrate.

The above description only refers to the specific embodiments of the present disclosure, but the scope of the present disclosure is not limited thereto. Changes or substitutions can be made to the present disclose within the scope of the present disclosure, such changes or substitutions should fall within the scope of the present disclosure. Therefore, the scope of the present disclosure should be defined by the scope of the claims.

What is claimed is:

1. A detection method for a display panel motherboard comprising a plurality of display panels arranged in a matrix, the detection method comprising:
    dividing the display panel motherboard into a plurality of detection regions, at least one detection region corresponding to at least a portion of each display panel in a same string of display panels; and
    performing a defect detection on patterns in all the display panels in the at least one detection region,
    wherein performing the defect detection on the patterns in the display panels in the at least one detection region comprises:
        photographing the display panel motherboard at a position corresponding to the detection region and acquiring a detection image of each display panel in the detection region; and
        comparing the detection images of different display panels in one and the same detection region to obtain a pattern of defect,
    wherein, before comparing the detection images of the different display panels in one and the same detection region to obtain the pattern of defect, the detection method comprises: acquiring a plurality of detection cells each having the pattern of defect to be determined from the detection image of each display panel by using a three-point comparison method or a five-point comparison method in the same detection region; and
    wherein comparing the detection images of the different display panels in one and the same detection region to obtain the pattern of defect comprises: successively comparing the detection cells at corresponding positions in the detection images of at least three adjacent display panels, excluding the detection cells having patterns of defect to be determined of a same topography, and retaining the detection cells having patterns of defect to be determined of different topographies, in the same detection region.

2. The detection method according to claim 1, wherein, acquiring the plurality of detection cells having the patterns of defect to be determined from the detection image of each display panel by using the three-point comparison method or the five-point comparison method in the same detection region comprises:
    using the three-point comparison method or the five-point comparison method to select three or five pixels having a same color from each of the plurality of detection cells having the patterns of defect, and selecting one of the pixels as a detected point and an other two or four of the pixels as reference points; and
    acquiring an average value of gray scales of the other two or four reference points, and determining the detection cell as one having the pattern of defect when an absolute value of a difference between the average value and the gray scale of the detected point is greater than a threshold.

3. The detection method according to claim 1, wherein performing the defect detection on the patterns in the display panels in the at least one detection region further comprises:
    acquiring, by photographing the display panel motherboard at the position corresponding to the detection region, actual positions of alignment marks disposed in a periphery of each display panel in the detection region, the alignment marks being configured to position the display panel; and
    acquiring positions of various pixels of each detection image in the detection region according to the actual positions of the alignment marks.

4. The detection method according to claim 1, wherein a projection of the at least one detection region on the display panel motherboard overlaps with a projection of at least a portion of each display panel in the same string of display panels on the display panel motherboard.

5. The detection method according to claim 3, wherein, before acquiring the actual positions of the alignment marks disposed in the periphery of each display panel in the detection region, the detection method further comprises: acquiring a preset arrangement position of each display panel on the display panel motherboard and preset positions of the alignment marks disposed in the periphery of each display panel; and
    wherein, after acquiring the actual positions of the alignment mark disposed in the periphery of each display panel in the detection region and before acquiring the positions of the various pixels of the detection image of each display panel in the detection region, the detection method further comprises: performing a coordinate correction on each display panel in the detection region according to the preset arrangement position of the display panel and the preset positions and the actual position of the alignment marks.

6. The detection method according to claim 5, wherein, before acquiring the actual positions of the alignment marks disposed in the periphery of each display panel in the detection region, the detection method further comprises: acquiring preset shapes of the alignment marks; and wherein acquiring the actual positions of the alignment marks disposed in the periphery of each display panel in the detection region comprises: determining a pattern of the alignment marks in the detection image of each display panel according to the preset arrangement position of the display panel, the preset positions and the preset shapes of the alignment marks.

7. The detection method according to claim 5, wherein, before acquiring the actual positions of the alignment marks disposed in the periphery of each display panel in the detection region, the detection method further comprises: acquiring preset sizes of the alignment marks; and wherein acquiring the actual positions of the alignment marks disposed in the periphery of each display panel in the detection region comprises: determining a pattern of the alignment marks in the detection image of each display panel according to the preset arrangement position of the display panel, the preset positions and the preset sizes of the alignment marks.

8. The detection method according to claim 1, wherein comparing the detection images of the different display panels in one and the same detection region to obtain the pattern of defect comprises: successively comparing the pixels at corresponding positions in at least three adjacent detection images one by one to obtain the pixel having the pattern of defect, in the same detection region, and wherein the at least three adjacent detection images respectively correspond to at least three adjacent display panels.

9. The detection method according to claim 1, wherein comparing the detection images of the different display panels in one and the same detection region to obtain the pattern of defect comprises: successively comparing the detection cells at corresponding positions in at least three adjacent detection images one by one to obtain the detection cell having the pattern of defect, in the same detection region, and wherein the at least three adjacent detection images respectively correspond to at least three adjacent display panels.

10. The detection method according to claim 1, wherein an area of the detection cell in the detection image is equal to an area of 5×5 pixels in the detection image.

11. The detection method according to claim 9, wherein an area of the detection cell in the detection image is equal to an area of 5×5 pixels in the detection image.

* * * * *